(12) United States Patent
Hoetger et al.

(10) Patent No.: US 8,307,651 B2
(45) Date of Patent: Nov. 13, 2012

(54) ARRANGEMENT FOR EXHAUST GAS HEAT UTILIZATION

(75) Inventors: Michael Hoetger, Berlin (DE); Jorg Collisi, Berlin (DE); Jurgen Berger, Garstetten (DE); Stephan Bartosch, Rammingen (DE)

(73) Assignees: AMOVIS GmbH, Berlin (DE); Voith Turbo GmbH & Co KG, Heidehheim (DE)

( * ) Notice: Subject to any disclaimer, the term of this patent is extended or adjusted under 35 U.S.C. 154(b) by 474 days.

(21) Appl. No.: 12/669,375

(22) PCT Filed: Jun. 6, 2008

(86) PCT No.: PCT/EP2008/057078
§ 371 (c)(1),
(2), (4) Date: Jan. 15, 2010

(87) PCT Pub. No.: WO2009/010339
PCT Pub. Date: Jan. 22, 2009

(65) Prior Publication Data
US 2010/0205950 A1    Aug. 19, 2010

(30) Foreign Application Priority Data
Jul. 17, 2007    (DE) .......................... 10 2007 033 611

(51) Int. Cl.
*F01K 23/10*    (2006.01)
(52) U.S. Cl. ................................ 60/618; 60/616; 60/320
(58) Field of Classification Search .................... 60/318, 60/597, 598, 618, 615, 616, 320
See application file for complete search history.

(56) References Cited

U.S. PATENT DOCUMENTS

| | | | | |
|---|---|---|---|---|
| 2,820,348 A | * | 1/1958 | Sauter | 60/659 |
| 2,919,540 A | * | 1/1960 | Percival | 60/618 |
| 3,893,300 A | * | 7/1975 | Connell | 60/683 |
| 3,937,017 A | * | 2/1976 | Beschorner et al. | 60/516 |
| 4,214,450 A | * | 7/1980 | Nagashima et al. | 60/648 |
| 5,130,099 A | * | 7/1992 | Schatz | 422/175 |
| 5,133,298 A | * | 7/1992 | Ahnger | 122/7 R |

(Continued)

FOREIGN PATENT DOCUMENTS

DE          42 41 317          12/1992
(Continued)

*Primary Examiner* — Thomas Denion
*Assistant Examiner* — Patrick Maines
(74) *Attorney, Agent, or Firm* — Thorpe North & Western LLP

(57) ABSTRACT

The invention relates to an arrangement for exhaust gas heat utilization comprising a steam generator arrangement (20) to which exhaust gas is applied, in which heat contained in the exhaust gas can be transferred to a working medium for further utilization, characterized by a heat accumulator (38) to which the exhaust gas can be applied, and control means for controlling exhaust gas partial flows according to a value representing the available heat energy of the exhaust gas by the heat accumulator and the steam generator arrangement. The arrangement is operated by means of a method using the following steps: a) applying exhaust heat to a steam generator arrangement; b) if more exhaust heat is available than required for the steam generation: diverting an exhaust gas partial flow into a heat accumulator; c) if less exhaust gas heat is available than required for the steam generation, and if the temperature of the heat accumulator is higher than the temperature of the exhaust gas entering into the arrangement: conducting the exhaust gas flow through the heat accumulator and subsequently through the steam generator arrangement.

14 Claims, 3 Drawing Sheets

U.S. PATENT DOCUMENTS

| | | | |
|---|---|---|---|
| 5,243,818 A * | 9/1993 | Schatz | 60/274 |
| 5,423,122 A | 6/1995 | Boltz et al. | |
| 6,756,140 B1 * | 6/2004 | McAlister | 429/411 |
| 7,454,911 B2 * | 11/2008 | Tafas | 60/618 |
| 2005/0262842 A1 * | 12/2005 | Claassen et al. | 60/618 |
| 2008/0115487 A1 * | 5/2008 | Harada et al. | 60/320 |

FOREIGN PATENT DOCUMENTS

| | | |
|---|---|---|
| DE | 10 2004 052106 | 5/2006 |
| DE | 10 2006 036122 | 2/2007 |
| DE | 31 48 208 | 2/2008 |
| EP | 455 062 | 9/2004 |
| JP | 06 222518 | 11/1985 |

* cited by examiner

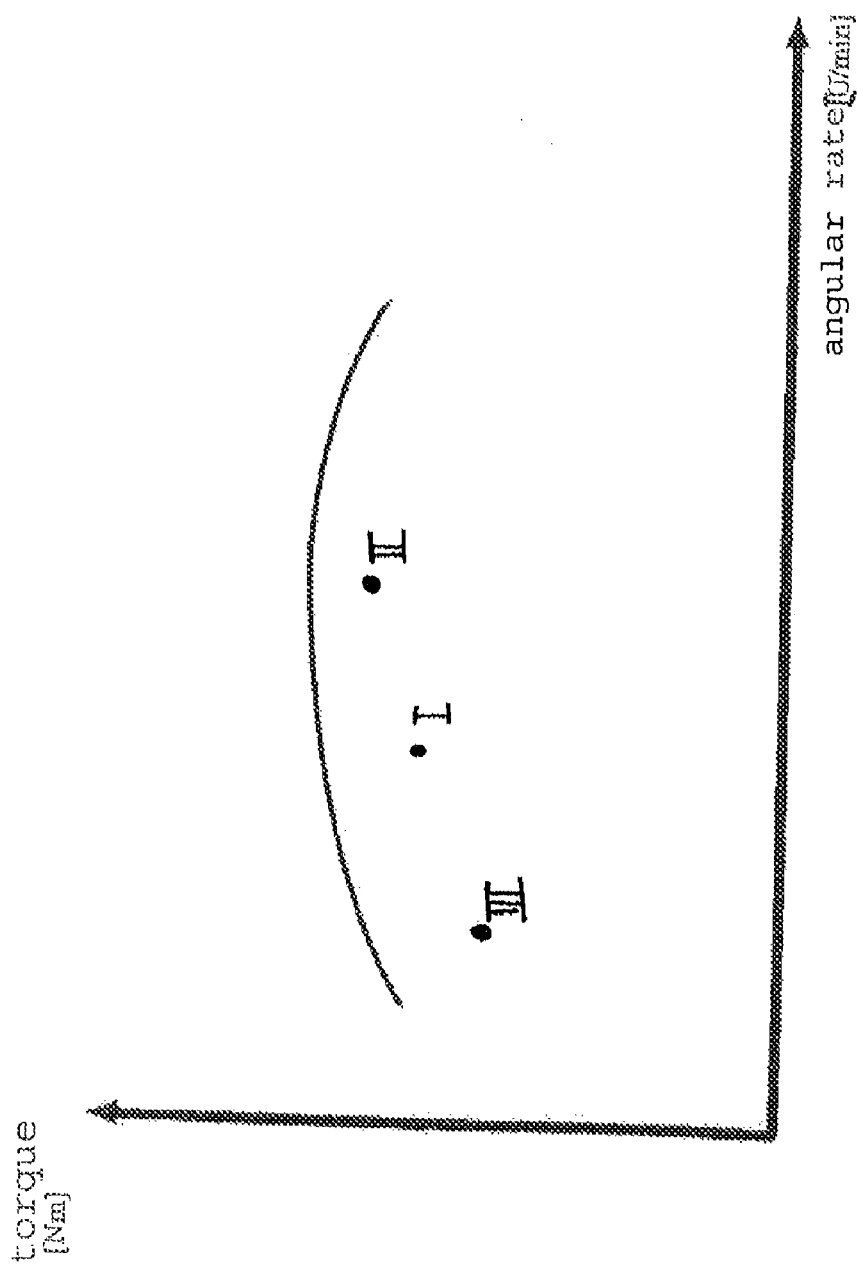

ARRANGEMENT FOR EXHAUST GAS HEAT UTILIZATION

TECHNICAL FIELD

The invention relates to an assembly for using exhaust heat with a steam generating assembly exposed to exhaust heat, wherein the heat contained in the exhaust gas is adapted to be transferred to a working medium for further use.

In a combustion process, such as in a motor, an energy carrier is combusted causing the generation of heat. The exhaust gas is expanded and generates mechanical energy. This energy is transferred to a shaft. The shaft can be used to run a vehicle or an electric generator. Energy is valuable. Therefore, there are many developments to use the heat remaining in the exhaust gas.

PRIOR ART

It is known to use hot exhaust gas as a heat source in an additional cycle with an expander and a condenser.

DE 2006 036 122 A1 discloses a driving device with the use of exhaust gas. The hot exhaust gas generated by a diesel engine is partly fed back to the engine. Thereby, the generation of damaging emissions is reduced. Furthermore, the exhaust gas is fed to a working medium cycle. The working medium is heated by the exhaust gas heat and the heat generated by the cooling cycle of the engine and expanded in an expansion engine generating mechanical energy.

The steam cycles used for the use of exhaust heat have an efficiency which depends on the temperature of the working medium and others. If the exhaust gas feeds to little heat to the steam cycle the temperature of the working medium drops. Thereby the efficiency and the amount of mechanical energy is reduced. If to much exhaust gas heat is available the efficiency is reduced also. A portion of the energy contained in the exhaust gas remains unused.

DISCLOSURE OF THE INVENTION

It is an object of the invention to further improve the energy balance of the use of exhaust gas heat described above. According to the invention this object is achieved by
(a) a heat store exposed to the exhaust gas, and
(b) control means for controlling sub streams of exhaust gas according to a value representing the heat energy of the exhaust gas available for the heat store and the steam generating assembly.

In particular, the object is achieved by a method for use of exhaust gas heat comprising the steps of
(a) exposing a steam generating assembly to exhaust gas heat;
(b) if there is more exhaust gas heat available than necessary for the generation of steam: deviating a substream of exhaust gas to a heat store;
(c) if there is less exhaust gas heat available than necessary for the generation of steam and the temperature of the heat store is higher than the temperature of the exhaust gas entering the assembly: flowing the exhaust gas stream through the heat store and through the steam generating assembly afterwards.

The invention is based on the realization that the use of a heat store can significantly improve the energy balance. Unused energy may be stored in the heat store and is available for use at a later stage. Therefore, it is not lost. On the other hand the exhaust gas temperature can be increased if necessary and thereby the efficiency of the steam cycle can be maintained in the optimal range. Apart from the use of the exhaust gas heat a further effect is, therefore, achieved. The maintenance of the optimum efficiency will further improve the energy balance.

Preferably, the control means comprise a temperature sensor sensing the temperature of the exhaust gas fed to the assembly. The temperature is representative for the heat energy contained in the exhaust gas. If the temperature exceeds an upper threshold value a substream of the exhaust gas can be flowed to the heat store. The exhaust gas transfers heat to the heat store and is released to the environment afterwards. The volume of the deviated exhaust gas stream depends on the measured temperature. Only a small substream is flowed to the heat store with a small excess temperature difference. If the exhaust gas temperature is high a large portion is flowed to the heat store. Preferably, a substream is always flowed to the steam generating assembly which is sufficient for an optimal efficiency.

Furthermore, the control means can comprise a temperature sensor detecting the steam exit temperature of the steam generating assembly. The temperature sensor is used to establish if sufficient exhaust heat is fed to the steam generating assembly. If the steam exit temperature is below a set threshold value with sufficient exhaust gas temperature and exhaust gas is flowed to the heat store the exhaust gas substream to the heat store is reduced and the exhaust gas substream to the steam generating assembly is increased until it reaches the set threshold value again.

If the steam exit temperature is below the set threshold value and no exhaust gas is flowed to the heat store because the exhaust gas temperature is too low, the temperature of the heat store is measured. For this purpose the control means may comprise a further temperature sensor positioned at the heat store. If the heat store is "full" and has a correspondingly high temperature, the exhaust gas with an exhaust gas temperature which is too low will be flowed through the heat store. There, it is heated to a temperature required for the steam generator. Thereby, it is possible that the steam cycle can continue to operate, even with smaller exhaust gas heat power, for at least a certain amount of time with optimal efficiency.

If the steam exit temperature exceeds the set threshold value, an exhaust gas substream is flowed to the heat store or the exhaust gas substream to the heat store is increased.

Preferably, the control means comprise valve assemblies or flaps to flow exhaust gas substreams of the exhaust gas entering the assembly with a selected ratio through the heat store and through a bypass to bypass the heat store. Valves or flaps can be easily controlled by a control unit. Furthermore, the control means may comprise valve assemblies or flaps to flow the exhaust gas stream exiting the heat store through the steam generating assembly or to bypass the steam generating assembly through a bypass.

The steam generating assembly may be integrated in a steam cycle. The mechanical or electric energy generated in the steam cycle is available for further use. If it is fed to the same application as the primary process, the energy balance of the primary process is correspondingly improved.

Preferably, the heat store comprises an exhaust gas resistant solid material which is temperature stable up to a temperature of at least 700° C. having a high specific heat capacity. In particular, it can be formed by a silicon carbide (SiC)-body. SiC is well available and easy to dispose of. However, different materials are also suitable, such as, for example, silicon infiltrated SiC (Si—SiC), SiC-powder mixed with water and extruded, different technical ceramics from aluminumoxide or the like, or nitrids. Metals are also suitable but they are less preferred for mobile applications due to their high weight. Contrary to known heat stores, such as crystallizing salt solutions, the heat storing is effected without a change of the phase. The materials are solid materials which are easy to transport without being a liquid or steam or the like.

Contrary to batteries where excess heat is converted to electric energy at first, the heat is directly stored. Accordingly, the system is operated without environmentally damaging chemical substances. The store can be loaded and unloaded without limits and the heat is quickly available.

The assembly for the use of exhaust gas can be used in any driving assembly comprising a driving engine and a steam cycle. In particular, a driving assembly can be used where the steam cycle comprises an expansion engine for driving a shaft in the form of an auxiliary driving engine wherein the steam generated in the steam generating assembly is expanded. Alternatively, the steam cycle can comprise an expansion engine for driving a generator wherein the steam generated in the steam generating assembly is expanded.

Further modifications of the invention are subject matter of the subclaims. An embodiment is described below in greater detail with reference to the accompanying drawings.

BRIEF DESCRIPTION OF THE DRAWINGS

FIG. 3 illustrates different working points of the assembly.

DESCRIPTION OF THE EMBODIMENT

Figure 1:
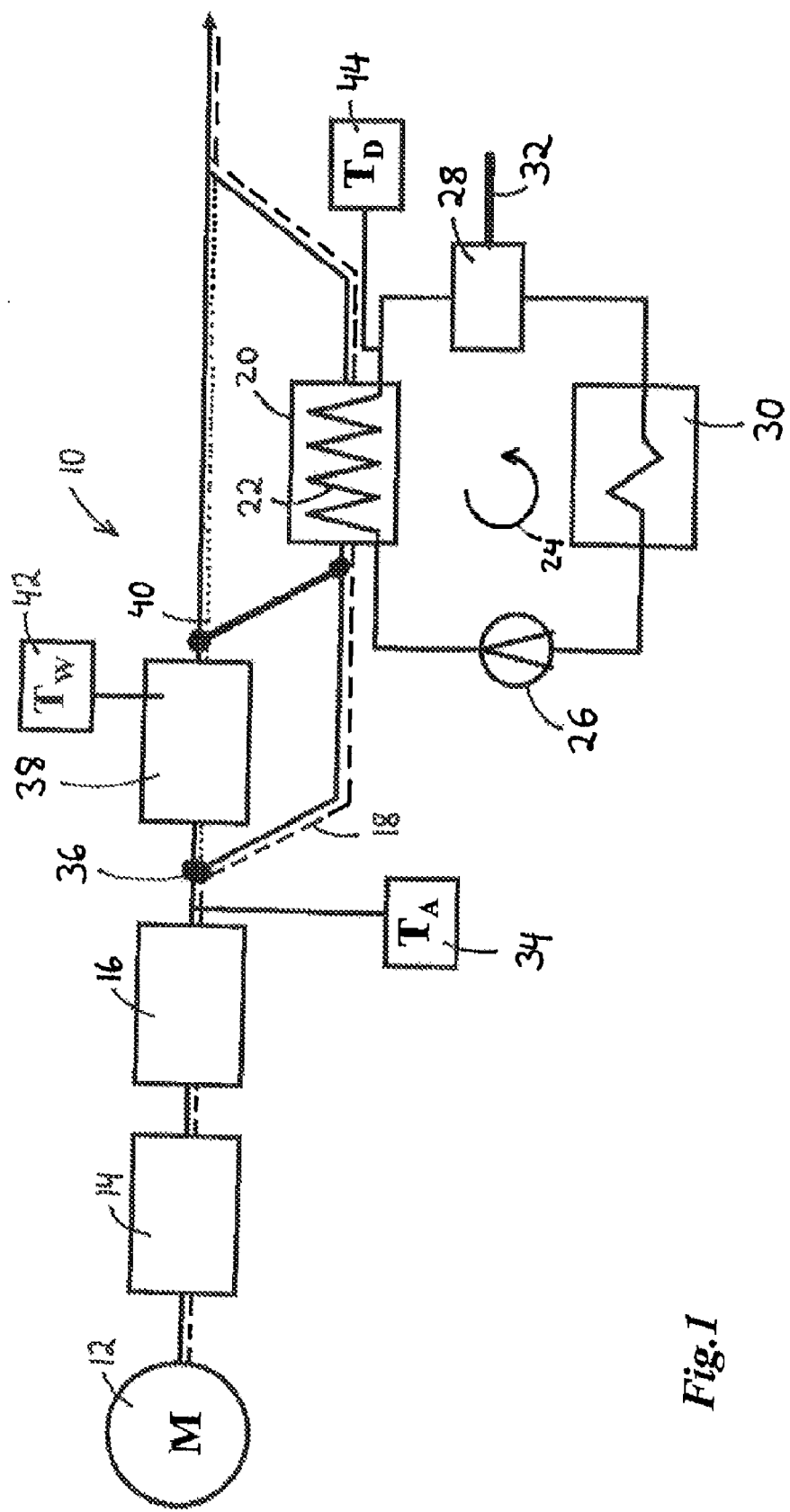
FIG. 1 is a schematic view of an assembly for the use of exhaust gas where hot exhaust gas is partially fed to a heat store.

FIG. 1 shows an assembly for the use of exhaust gas heat generally denoted by numeral 10. A diesel engine 12 with a turbo charger 14 serves as a driving engine for a vehicle. The vehicle may be any kind of vehicle. Cars, trucks, trains, ships, farm machines and the like can be provided with such an assembly. Even though the present embodiment is described with a diesel engine, it may, of course, be also used with an Otto-engine, Wankel-engine, turbines or the like.

The exhaust gas generated by the engine 12 is treated with a catalyst and further exhaust gas treatment steps. Such exhaust gas treatment steps are generally denoted with numeral 16 in FIG. 1.

The hot exhaust gas represented by the dashed line 18 is fed to a steam generator 20. After cooling the exhaust gas in the steam generator 20 the exhaust gas is released to the atmosphere.

In the steam generator 20 the hot exhaust gas heats a heat exchanger 22, the working medium flowing therethrough. The steam generator 20 is part of a steam cycle 24. In the steam cycle 24 a working medium is pumped to a higher pressure level by a feed-water pump 26. Afterwards, the working medium is heated in the steam generator 20. The hot, compressed working medium is expanded in an expansion machine 28 generating mechanical power. The expanded working medium is condensed in a condenser 30 and is available afterwards for a further run in the cycle.

The mechanical energy generated in the expander 28 of the steam cycle 24 is transferred to a shaft 32. This shaft can serve as an auxiliary drive for the vehicle. Alternatively, the shaft can drive an air-conditioning compressor or a generator for the generation of electrical energy. In each case the exhaust gas heat is used in a form which causes a reduction of the energy demand.

It is understood that the above described Clausius-Rankine steam cycle 24 may be designed in another way. For example, a steam cycle according to Calina or the like may also be used. The design of the steam cycle may be adapted to the respective application. In particular, the steam cycle is designed in such a way that it has an optimal efficiency at its normal working point, i.e., that with normal exhaust gas temperatures an optimal evaporation is achieved in the steam generator. This working point is denoted "I" in FIG. 3.

If the load of the engine 12 is increased, i.e., if the torque is increased, the temperature of the exhaust gas also increases. Then, the working point of the engine 12 is not at I, but, for example, at II in FIG. 3. Such a case will occur, for example, if the vehicle drives upwards or if the vehicle is driven particularly fast.

The high amount of heat of the exhaust gas involved with the high temperature exceeds the energy demand of the steam generator. Accordingly, the steam cycle does not have the optimum efficiency anymore. Therefore, the steam exit temperature $T_D$ and the exhaust gas temperature $T_A$ are measured with temperature sensors 44 and 34 and transmitted to a control device (not shown). Instead of measuring the temperature, it is also possible to use a different value representing the load, such as, for example, the calculation of the load point from the position of the pedal using an engine characteristic map, the determination of the engine rotation speed, or the like.

If the exhaust gas temperature or the value representing the exhaust gas temperature is higher than a threshold, a valve 36 is opened. A substream represented by a doted line 40 of the exhaust gas is flowed through a heat store 38. The remaining part of the exhaust gas will continue to flow through the steam generator 20.

The heat store 38 is a porous solid body made of silicon carbide (SiC) which is isolated on its outside. The heat store has a high specific heat capacity. It directly absorbs heat and stores it. The temperature $T_W$ of the heat store is measured with a temperature sensor 42. As long as the temperature $T_W$ of the heat store is smaller than the Temperature $T_A$ of the exhaust gas the heat store can absorb and store energy in the form of heat.

The portion of the exhaust gas stream flowed through the heat store depends on the temperature $T_A$ of the exhaust gas stream. The higher the temperature the larger the exhaust gas substream 40.

If the load of the engine 12 decreases, i.e., if the torque decreases, the temperature of the exhaust gas also drops. The working point of the engine 12 is not positioned at I anymore, but, for example, at III in FIG. 3. Such is the case if the vehicle drives, for example, downwards or if the vehicle stops. With trains this situation occurs if the train stands in a train station (little exhaust heat) after a long journey (much exhaust heat).

The temperature sensor 34 determines the small temperature value. In order to maintain the steam exit temperature $T_D$ further on an optimal value, the exhaust gas is completely flowed through the heat store 38. There, the exhaust gas absorbs stored heat. It is, of course, necessary that the temperature $T_W$ in the heat store exceeds the exhaust gas temperature $T_A$. In such situation, the valves 46 and 48 are adjusted such that the entire exhaust gas stream represented by the interrupted line 50 is flowed to the steam generator 20. The energy absorbed in the heat store 38 is released in the steam generator 20. In such a way the steam cycle can be continued to be operated until all the stored heat is released.

The efficiency of the assembly shall be described with a small calculation example.

A diesel engine of a truck with an average load of 60% corresponding to 100 Kilowatt and a torque of, for example, 1300 rotations per minute, has an exhaust temperature of about 450° C. In this case the entire exhaust gas is flowed to the steam generator 20. The working medium reaches a temperature of about 400° C. The steam cycle is designed in such a way that it has an optimal efficiency for this mode of operation. The steam cycle has a power of 10 kW. This corresponds to a reduction of the energy demand of 10%.

With full load driving upwards the gear is changed down. In this case the engine operates with 230 kW and 1800 rpm. The exhaust gas has then a temperature of about 600° C. 60% of the exhaust gas energy can be transferred to the steam generator 20. The steam cycle has a portion of the entire power of about 7%. The remaining 40% of the exhaust gas heat, corresponding to an exhaust gas substream of 40% is flowed to the heat store 38. The heat store 38 is high temperature resistant until about 2000° C. and can easily absorb the heat.

Figure 2:
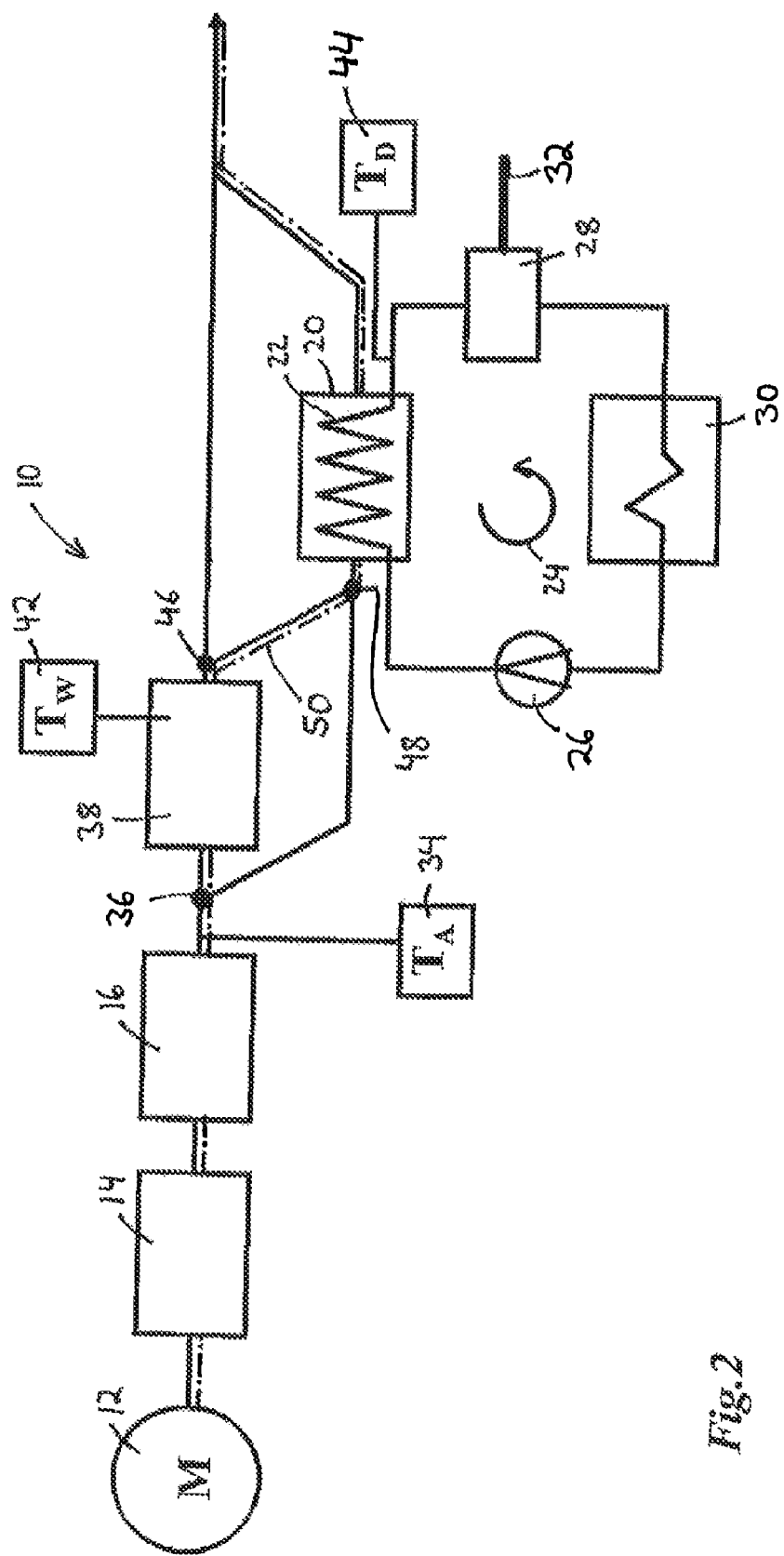
FIG. 2 shows the assembly of FIG. 1 where the exhaust heat is not sufficient for an optimal efficiency in a steam cycle and is, therefore, heated by the heat store.

With idle engine or with a trip with small load of, for example, 30% corresponding to 1300 rpm the engine operates only at 50 kW. The exhaust gas temperature drops to 300° C. The temperature is, therefore, not optimal for the steam cycle. The exhaust gas stream is then flowed through the heat store as shown in FIG. 2 and heated to a temperature above 450° C. If the heat store is hot enough to produce a steam exit temperature $T_D$ which is too high only a suitable portion is flowed through the heat store.

The exhaust gas having the correct temperature is flowed through the steam generator 20 and the steam cycle operates with an optimum efficiency even with small loads and produces about 10 kW of the entire 50 kW. Accordingly, the portion of the steam cycle of the entire power is doubled from 10% to 20%.

The use of the heat store will cause a saving of the energy in the present example of additional 10%.

It is understood, that the present example is only a calculation example for illustration of the invention and that modifications of the assembly itself and the mode of operation will not affect the general idea of the invention.

The invention claimed is:

1. An assembly for using exhaust heat energy contained in exhaust gas of a primary combustion process in a steam cycle, said steam cycle operating with a working medium, said assembly comprising:
    a steam generating assembly exposed to said exhaust heat, and
    transfer means for transferring said exhaust heat energy to said working medium for further use,
    and further comprising:
    a heat store exposed to said exhaust gas,
    means for producing substreams of said exhaust gas flowing through said heat store and said steam generating assembly, and
    control means for controlling said substreams depending on a value representing said exhaust heat energy of said exhaust gas.

2. The assembly of claim 1, wherein the exhaust gas has an exhaust gas temperature and the control means comprise a temperature sensor sensing the temperature of the exhaust gas fed to the assembly.

3. The assembly of claim 1, wherein the working medium is flowed through the steam generating assembly exiting with a steam exit temperature and the control means comprise a temperature sensor detecting the steam exit temperature.

4. The assembly of claim 1, wherein the control means comprise valve assemblies or flaps to flow exhaust gas substreams with a selected ratio through the heat store and through a bypass to bypass the heat store.

5. The assembly of claim 1, wherein the control means comprise valve assemblies or flaps to flow the exhaust gas exiting the heat store through the steam generating assembly or to bypass the steam generating assembly through a bypass.

6. The assembly of claim 1, wherein the steam generating assembly is integrated in a steam cycle.

7. The assembly of claim 1, wherein the heat store comprises an exhaust gas resistant, solid material which is temperature stable up to a temperature of at least 700° C. having a high specific heat capacity.

8. The assembly of claim 7, wherein the heat store comprises a SiC-body.

9. Driving assembly comprising a driving engine and a steam cycle comprising an assembly for use of exhaust gas according to claim 1.

10. The driving assembly of claim 9, wherein the steam cycle comprises an expansion engine for driving a shaft in the form of an auxiliary driving engine, said expansion engine expanding steam generated in the steam generating assembly.

11. The driving assembly of claim 9, wherein the steam cycle comprises an expansion engine for driving a generator, said expansion engine expanding steam generated in the steam generating assembly.

12. Heat store for the use in the assembly of claim 1, wherein the heat store comprises an exhaust gas resistant, solid material which is temperature stable up to a temperature of at least 700° C. having a high specific heat capacity.

13. The heat store of claim 12, wherein the solid material is SiC.

14. Method for the use of exhaust gas comprising the steps of:
    (a) exposing a steam generating assembly to exhaust gas heat;
    (b) if there is more exhaust gas heat available than necessary for the generation of steam: deviating a substream of exhaust gas to a heat store;
    (c) if there is less exhaust gas heat available than necessary for the generation of steam and the temperature of the heat store is higher than the temperature of the exhaust gas entering the assembly: flowing the the exhaust gas stream through the heat store and through the steam generating assembly afterwards.

* * * * *